United States Patent
Hong et al.

(10) Patent No.: US 7,744,072 B2
(45) Date of Patent: Jun. 29, 2010

(54) POSITIONING DEVICE

(75) Inventors: James Juehui Hong, Shenzhen (CN);
Ze-Ya Cheng, Shenzhen (CN);
Dong-Cheng Liu, Shenzhen (CN);
Chin-Tsan Huang, Taipei Hsien (TW);
Ya-Juan Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/965,742

(22) Filed: Dec. 28, 2007

(65) Prior Publication Data
US 2009/0072463 A1    Mar. 19, 2009

(30) Foreign Application Priority Data
Sep. 17, 2007    (CN) .......................... 2007 1 0201743

(51) Int. Cl.
*B23Q 1/25*    (2006.01)

(52) U.S. Cl. .............................. 269/34; 269/130; 269/71
(58) Field of Classification Search .................... 269/34, 269/49, 71, 97, 95, 48.1, 79, 130, 131
See application file for complete search history.

(56) References Cited

U.S. PATENT DOCUMENTS

| | | | |
|---|---|---|---|
| 5,707,053 A * | 1/1998 | Plunkett et al. | 269/49 |
| 6,089,546 A * | 7/2000 | Griffioen et al. | 254/134.4 |
| 2009/0072463 A1 * | 3/2009 | Hong et al. | 269/71 |

* cited by examiner

*Primary Examiner*—Lee D Wilson
(74) *Attorney, Agent, or Firm*—Frank R. Niranjan

(57) ABSTRACT

An exemplary positioning device used for moving a workpiece to a targeted position, the positioning device includes: a pulling member, a platform, a guiding member, two opposite positioning members, and a cable. The guiding member is located on the platform. The positioning members are located on the guiding member. The cable connects the pulling member with the two guiding members. The pulling member is capable of pulling the two positioning members to move along the guiding member via the cable.

20 Claims, 3 Drawing Sheets

POSITIONING DEVICE

BACKGROUND OF THE INVENTION

1. Field of the Invention

The present invention relates to positioning devices.

2. Discussion of the Related Art

In the manufacturing industry, it is frequently necessary to test a workpiece or assemble a plurality of workpieces as a module. Before testing or assembling, it is commonly necessary that the workpiece is positioned on a targeted position.

Generally, positioning the workpiece on the targeted position is performed by a positioning device, such as a centering device. Typically, the centering device includes a platform, a raised platform, four guide rails, four pushing blocks, a plurality of hinges, four connecting shafts, and a motor. The raised platform and the guide rails are located on the platform. The guide rails are positioned around the raised platform. The pushing blocks are on the guide rail. The connecting shafts connect with the motor via the hinges. In use, when the motor is startup, the motor pulls the pushing blocks to move along the guide rail via the connecting shaft, and the pushing blocks push a workpiece placed on the raised platform to move until a centre of the workpiece reaches a centric axis between the four pushing blocks.

However, the connecting shafts are rigid, thus joint structures between the hinges and the connecting shafts are complex. As a result, an arrangement of the above components is prone to being demanding. In addition, if a configuration of the centering device is adjusted, the structures of connecting shafts may need to be changed. Because the connecting shafts are complex, a process of reconstituting the connecting shafts would be involved. Thus adjustment of the centering device is inconvenient.

Therefore, a new positioning device is desired in order to overcome the above-described shortcomings.

SUMMARY

In one aspect, a positioning device according to a preferred embodiment used for positioning a workpiece on a targeted position, the positioning device includes: a pulling member, a platform, a guiding member, two opposite positioning members, and a cable. The guiding member is located on the platform. The positioning members are located on the guiding member. The cable connects the pulling member with the two guiding members. The pulling member is capable of pulling the two positioning members to move along the guiding member via the cable.

Other advantages and novel features will become more apparent in the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present new positioning device. Moreover, in the drawings, like reference numerals designate corresponding parts throughout the several views, and all the views are schematic.

DETAILED DESCRIPTION OF THE PREFERRED EMBODIMENTS

Figure 1:
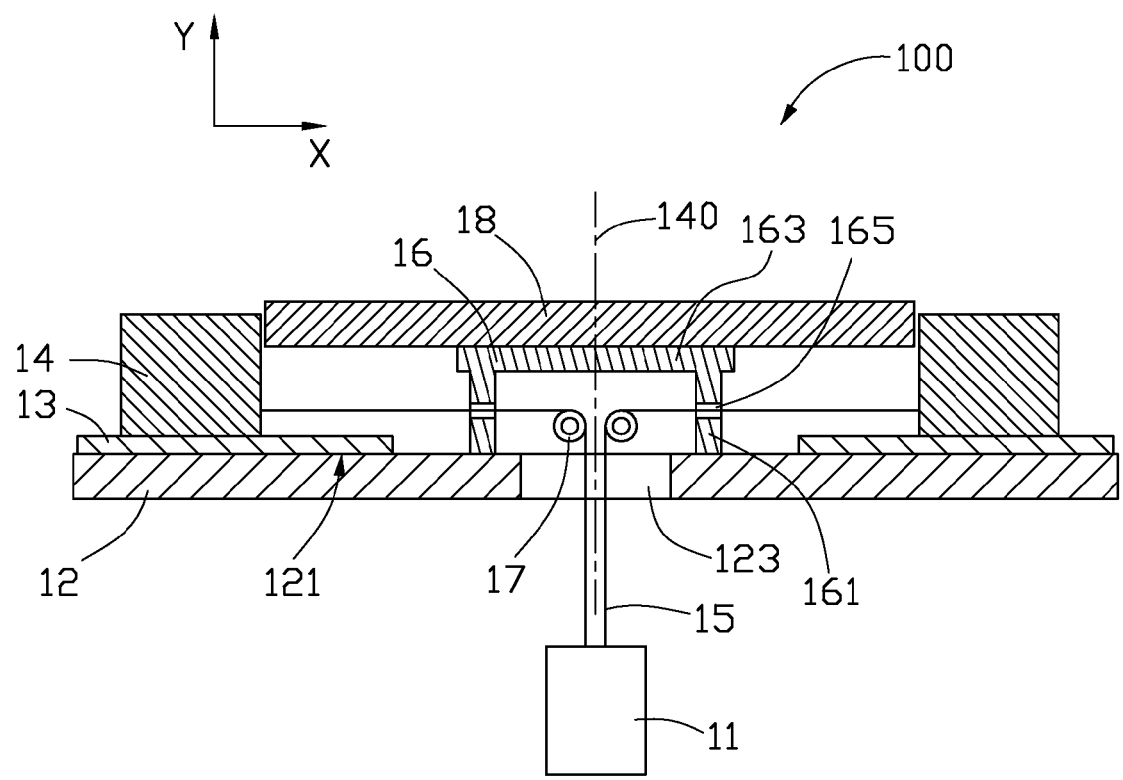
FIG. 1 is a cross-sectional, explanatory view of a positioning device according to a first preferred embodiment of the present invention.

Referring to FIG. 1, a positioning device 100 according to a first preferred embodiment of the present invention is shown. The positioning device 100 is used for positioning a workpiece 18 on a targeted position. The positioning device 100 includes a platform 12, a raised platform 16 on the platform 12, and an aligning clamp (not labeled). The aligning clamp includes a pulley system (not labeled) and two guiding member 13. The two guiding member 13 are disposed on the platform 12. The pulley system has an air cylinder 11, two positioning member 14, two cables 15, and two pulleys 17. The two cables 15 ties the two positioning member 14 to the air cylinder 11 through the two pulleys 17 respectively. The air cylinder is capable of pulling the two positioning member 14 along the two guiding member 13 via the two cables 15.

In a described embodiment, the platform 12 includes a top surface 121 and a first through hole 123. The first through hole 123 is defined in a middle portion of the platform 12. The raised platform 16 is positioned on the top surface 121 above the first through hole 123. The raised platform 16 is a hollow frame. The raised platform 16 has two sidewalls 161 on opposite sides of the raised platform 16, a top sheet 163 connecting the sidewalls 161, and two second through holes 165 defined in the two sidewalls 161 correspondingly. The two guiding members 13 are positioned on the top surface 121 adjacent to the raised platform 16. The positioning members 14 are located on the guiding members 13. The two cables 15 have the same length. Each of the cables 15 has two ends. Each of the cables 15 is fixed to one of the positioning members 14 at one end, runs through one of the second through hole 165, over one of the pulley 17, and fixed to the air cylinder 11 at another end correspondingly. In addition, when the cables 15 are drawn straight by the positioning member 14 and the pulling member 11, the two positioning member 14 and the two cables 15 would have a same symmetrical axis 140.

The guiding members 13 may be a guide rail or a guide column. The guide rail may include a guiding groove or a guiding protrusion.

The positioning member 14 may be a block. A shape of a contacting portion (not labeled) of the positioning member 14 that is used to contact the workpiece 18 may be configured according to a shape and a material of the workpiece 18. For example, if the material of the workpiece 18 is frangible, the contacting portion is, preferably, configured to have a large surface. The large surface of the contacting portion may increase a contact area between the positioning member 14 and the workpiece 18, thereby preventing the workpiece 18 from being damaged. It should be pointed out that, if the contacting portion is elastic, the shape of the contacting portion may be configured without considering a frangible property of the workpiece 18.

Preferably, each cable 15 is substantially not stretchable. The cables 15 can be a steel wire or a nylon rope.

The air cylinder 11 is configured to pull the positioning members 14 via the cables 15. The two cables 15 can be fixed to a same piston of the air cylinder 11. When the air cylinder 11 starts up, the air cylinder 11 pulls the two positioning member 14 along the two guiding member 13 via the two cables 15. In an alternative embodiment, the air cylinder 11 can be replaced by other pulling members, such as a motor.

The positioning device 100 is used for positioning the workpiece 18 placed on the sheet 165 of the raised platform 16 to a targeted position. In this embodiment, the targeted position is the axis 140. That is, the positioning device 100 would move the workpiece 18, until a centre of the workpiece 18 is aligned with the axis 140. When the air cylinder 11 is started, the air cylinder 11 pulls the positioning member 14 along the guiding members 13 via the cables 15, and the positioning members 14 pushes the workpiece 18 placed on the sheet 165 to move until the centre of the workpiece 18 is aligned with the axis 140.

In the positioning device 100, the air cylinder 11 and the positioning members 14 are connected by the cables 15. Because the cables 15 are bendable, a wiring path of the cables 15 can change easily according to an arrangement of other members of the positioning device 100. More particularly, the pulleys 17 are allowed to easily change the wiring path. Thus the configuration of the positioning device 100 tends to be designed advantageously and simply. Furthermore, if the configuration of the positioning device 100 needs to be adjusted, for example, if the positioning device 100 is used to position workpieces with difference sizes, only the cables 15 need to be changed. Therefore it is convenient to adjust the configuration of the positioning device 100.

It should be pointed out that, if the air cylinder 11 and the positioning member 14 are on a same horizontal height, the pulleys 17 can be omitted. The two cables 15 may be tied together, that is the cable can be one. In addition, if a surface of the raised platform 16 where the workpiece 18 is placed, is smooth, the workpiece 18 would be further prevented from be scratched.

Figure 2:
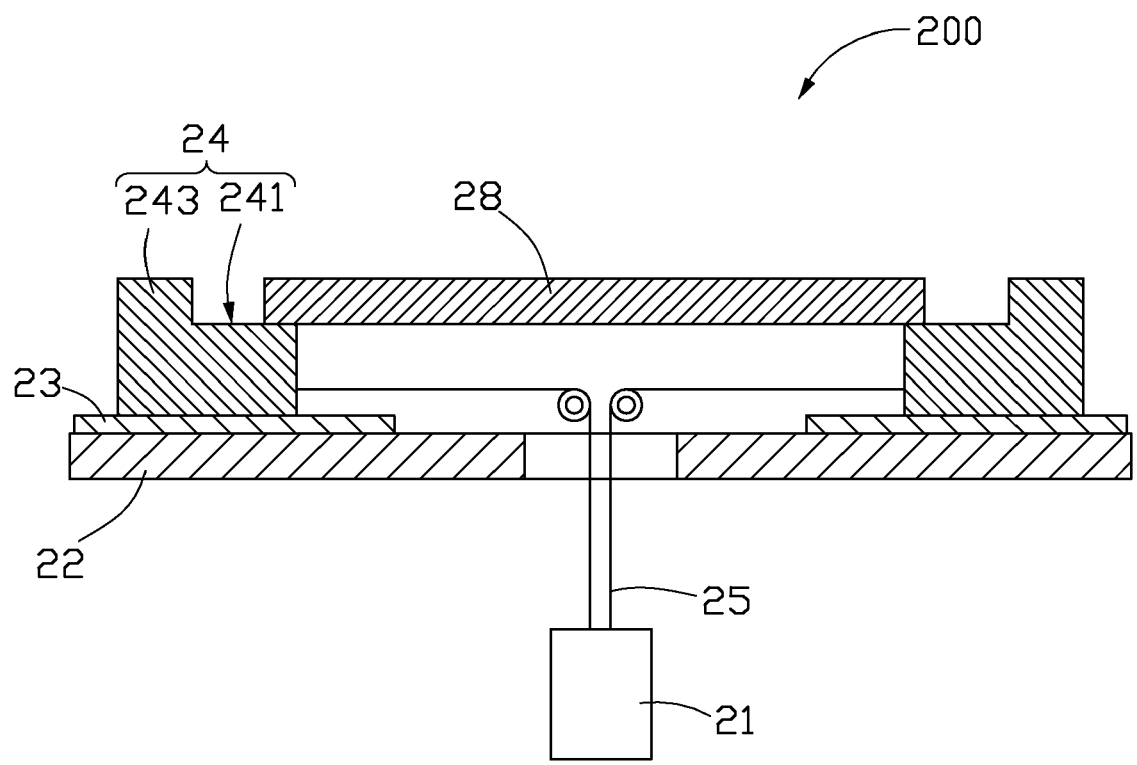
FIG. 2 is a cross-sectional, explanatory view of a positioning device according to a second preferred embodiment of the present invention.

Referring to FIG. 2, a positioning device 200 according to a second preferred embodiment of the present invention is shown. The positioning device 200 includes a pulling member 21, a platform 22, two guiding members 23, two opposite positioning members 24, and two cables 25. Each positioning member 24 includes a receiving surface 241 and a protrusion 243 on an end of the receiving surface 241. The receiving surface 241 is used to place a workpiece 28 thereon. The protrusion 243 is configured for pushing the workpiece 28.

Figure 3:
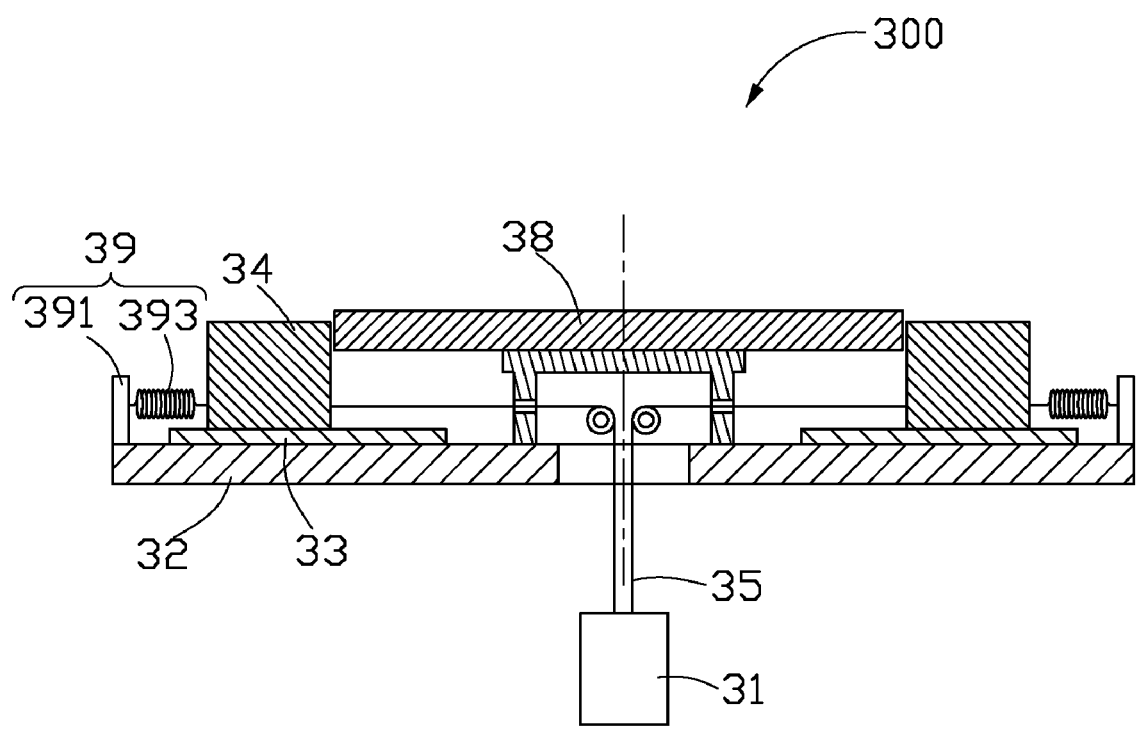
FIG. 3 is a cross-sectional, explanatory view of a positioning device according to a third preferred embodiment of the present invention.

Referring to FIG. 3, a positioning device 300 according to a third preferred embodiment of the present invention is shown. The positioning device 300 includes a pulling member 31, a platform 32, two guiding members 33, two opposite positioning members 34, two cables 35, and two returning members 39. Each returning members 39 includes a fixing board 391 and a spring 393. The fixing board 391 is fixed on the platform 32. The spring 393 connects the fixing board 391 with the positioning member 34. In use, the returning members 39 is configured for returning the guiding member 33 to its former position, after the guiding member 33 pushes a workpiece 38 to a targeted position. The use of the returning members 39 is advantageous to continuously move a plurality of workpieces 38 to the targeted position one after the other.

It is noted that the scope of the present positioning device is not limited to the embodiments described above. For example, in the positioning device 100, if the horizontal length of the two cables 15 are different and the vertical length of the two cables 15 are equal, the centre of the workpiece 18 may be moved to a different position other than the axis 140. Number of the positioning member 14 can be one, three, four and more.

While various preferred and exemplary embodiments have been described, the embodiments can further be modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A positioning device used for positioning a workpiece at a targeted position, the positioning device comprising:
   a pulling member;
   a platform;
   a guiding member located on the platform;
   two opposite positioning members located on the guiding member;
   a cable connecting the pulling member with the two positioning members;
   a pulley configured for redirecting an extending direction of the cable; and
   a returning member, the returning member comprising a spring and a fixing board, the fixing board fixed to the platform, the spring connecting the fixing board with the positioning members;
   wherein the pulling member pulls the two positioning members to move along the guiding member via the cable.

2. The positioning device as described in claim 1, wherein the positioning device further comprises a raised platform configured for receiving the workpiece, and the raised platform is located on the platform.

3. The positioning device as described in claim 2, wherein the two opposite positioning members are located on the guiding member, and the raised platform is located between the positioning members.

4. The positioning device as described in claim 1, wherein each positioning member comprises a receiving surface and a protrusion formed on the receiving surface, and the protrusion is configured for pushing the workpiece.

5. The positioning device as described in claim 1, wherein the positioning device further comprises a returning member, the returning member having a spring and a fixing board, the fixing board fixed to the platform, the spring connecting the fixing board with the positioning member.

6. The positioning device as described in claim 1, wherein the guiding member is one of a guide rail and a guide column.

7. The positioning device as described in claim 1, wherein the cable is one of a wire and a rope.

8. The positioning device as described in claim 7, wherein the wire is made of steel.

9. The positioning device as described in claim 7, wherein the rope is made of nylon.

10. The positioning device as described in claim 1, wherein the pulling member is one of a motor and an air cylinder.

11. The positioning device as described in claim 1, wherein the positioning device further comprises a raised platform configured to receive the workpiece, and the raised platform is located on the platform.

12. The positioning device as described in claim 11, wherein the raised platform is located between the positioning members.

13. The positioning device as described in claim 1, wherein the guiding member is one of a guide rail and a guide column.

14. The positioning device as described in claim 1, wherein the pulling member is one of a motor and an air cylinder.

15. The positioning device as described in claim 1, wherein the workpiece is positioned at the targeted position when the pulling member pulls the two positioning members to move towards each other along the guiding member in position via the cable.

16. A positioning device used for positioning a workpiece at a targeted position, the positioning device comprising:
- a pulling member, the pulling member being one of a motor and an air cylinder;
- a platform;
- a guiding member located on the platform;
- two opposite positioning members located on the guiding member;
- a cable connecting the pulling member with the two positioning members; and
- a pulley configured for redirecting an extending direction of the cable;
- wherein the pulling member pulls the two positioning members to move along the guiding member via the cable, the pulling member is one of a motor and an air cylinder.

17. The positioning device as described in claim 16, wherein the positioning device further comprises a raised platform configured to receive the workpiece, and the raised platform is located on the platform and between the positioning members.

18. The positioning device as described in claim 16, wherein the positioning device further comprises a returning member, the returning member having a spring and a fixing board, the fixing board fixed to the platform, the spring connecting the fixing board with the positioning member.

19. The positioning device as described in claim 16, wherein the guiding member is one of a guide rail and a guide column.

20. The positioning device as described in claim 16, wherein the workpiece is positioned at the targeted position when the pulling member pulls the two positioning members to move towards each other along the guiding member in position via the cable.

* * * * *